United States Patent
Yokota

(10) Patent No.: US 7,614,650 B2
(45) Date of Patent: Nov. 10, 2009

(54) SIDE-IMPACT AIRBAG AND SIDE-IMPACT AIRBAG APPARATUS

(75) Inventor: Masatoshi Yokota, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/153,463

(22) Filed: May 20, 2008

(65) Prior Publication Data

US 2009/0039626 A1 Feb. 12, 2009

(30) Foreign Application Priority Data

Aug. 9, 2007 (JP) ............... 2007-207690

(51) Int. Cl.
*B60R 21/20* (2006.01)
*B60R 21/207* (2006.01)

(52) U.S. Cl. ................ 280/730.2; 280/729; 280/743.1; 280/743.2

(58) Field of Classification Search ................ 280/729, 280/730.2, 743.1, 743.2
See application file for complete search history.

(56) References Cited

U.S. PATENT DOCUMENTS

| | | | | |
|---|---|---|---|---|
| 5,492,367 A | * | 2/1996 | Albright et al. | 280/743.1 |
| 5,899,490 A | * | 5/1999 | Wipasuramonton et al. | 280/730.2 |
| 5,906,395 A | * | 5/1999 | Isaji et al. | 280/743.1 |
| 6,213,500 B1 | * | 4/2001 | Jost et al. | 280/730.2 |
| 7,350,811 B2 | * | 4/2008 | Sato | 280/743.2 |
| 2004/0160048 A1 | * | 8/2004 | Hasebe et al. | 280/743.1 |
| 2004/0251669 A1 | * | 12/2004 | Fischer et al. | 280/743.1 |
| 2006/0022441 A1 | * | 2/2006 | Hayashi et al. | 280/730.2 |
| 2007/0164546 A1 | * | 7/2007 | Kai et al. | 280/730.2 |
| 2007/0267853 A1 | * | 11/2007 | Kato et al. | 280/730.2 |
| 2008/0079249 A1 | * | 4/2008 | Yamamura | 280/730.2 |

FOREIGN PATENT DOCUMENTS

JP 2004-203272 7/2004
JP 2007-99085 A * 4/2007

* cited by examiner

*Primary Examiner*—Ruth Ilan
*Assistant Examiner*—James English
(74) *Attorney, Agent, or Firm*—Manabu Kanesaka

(57) ABSTRACT

A side-impact airbag is housed in a casing to be deployed between a side wall portion of a vehicle body and an occupant seated on a seat. The side-impact airbag includes an upper portion, and a lower portion situated below the upper portion. The upper and lower portions are folded opposite to each other in a width direction of the vehicle in housing in the casing.

8 Claims, 5 Drawing Sheets

SIDE-IMPACT AIRBAG AND SIDE-IMPACT AIRBAG APPARATUS

BACKGROUND OF THE INVENTION AND RELATED ART STATEMENT

The present invention relates to a side-impact airbag and a side-impact airbag apparatus, for restraining an occupant in the event of a lateral collision or the like of a vehicle such as an automobile or the like.

Hitherto, a side-impact airbag apparatus, in which a side-impact airbag is expanded toward a side portion of an occupant by means of an inflator and restrains a body of the occupant in the event of lateral collision of the vehicle, a rollover of the vehicle body, or the like is well known. The side-impact airbag apparatus is housed in, for example, a backrest portion of a seat, and in the event of lateral collision or the like, the side-impact airbag is expanded and developed from the backrest portion to a space between the occupant and a side wall portion of the vehicle body by gas that is blown out from the inflator.

As a folding method for the side-impact airbag in housing described above, a so-called roll folding wherein the side-impact airbag is folded back while being rolled to make a roll shape, (for example, refer to the Patent Document 1: Japanese Unexamined Patent Application Publication No. 2004-203272) or the like is known.

In the aforementioned conventional technology, a basic side-impact airbag apparatus is disclosed, wherein the side-impact airbag apparatus is housed in a backrest portion of a seat of a vehicle with the side-impact airbag being rolled into a roll shape, and it is caused to expand into a space between an occupant and a side wall portion of a vehicle body in the event of an emergency. In the side-impact airbag apparatus having such a configuration, it is required to have a stable developing capability without having a portion to be interrupted.

An object of the present invention is to provide a side-impact airbag and a side-impact airbag apparatus capable of improving a developing stability.

Further objects and advantages of the invention will be apparent from the following description of the invention.

SUMMARY OF THE INVENTION

In order to achieve the above-described object, as for the first aspect of the invention, a side-impact airbag is housed in a casing in a folded-back manner, and expanded and developed in a space between a side wall portion of a vehicle body and an occupant seated in a seat of the vehicle. The side-impact airbag is housed in the casing in such a way that turnback directions of an upper portion and a lower portion of the airbag are opposite to each other in a width direction of the vehicle.

Regarding the first aspect of invention, the side-impact airbag is housed in the casing that is built in, for example, the backrest portion of the seat in a folded-back manner, and is expanded and developed in the space between the occupant and the side wall portion of the vehicle body from the casing by the gas blown out from the inflator in the event of the lateral collision of the vehicle, the rollover of the vehicle body, or the like.

In the first aspect of the invention, the side-impact airbag is housed in the casing while being folded back in such a way that turnback directions of the upper and lower portions of the airbag are opposite to each other in the width direction of the vehicle. Thereby, it becomes capable of housing the upper portion of the side-impact airbag in the casing while turning back and folding back the upper portion toward the side wall portion side of the vehicle body, and housing the lower portion in the casing while turning back and folding back the lower portion toward the occupant side. As a result, in the side-impact airbag, the lower portion thereof can be developed while releasing the folded-back condition at the occupant side opposite to the side wall portion side where a vehicle component such as an elbow rest or the like exists so that the lower portion may easily be interrupted. Also, the upper portion of the airbag can be developed while releasing the folded-back condition at the side wall portion side where a specific structure which may interrupt the upper portion does not exist. Therefore, since the side-impact airbag can be smoothly developed without being caught thereon or the like, a developing stability can be improved.

Further, in this case, in the side-impact airbag, since the upper portion of the side-impact airbag situated nearer a head portion of the occupant is developed at the side wall portion side opposite to the occupant side, while releasing the folded-back condition, there is also an advantage that safety is improved.

The second aspect of the invention is that, in the first aspect of the invention, the upper portion of the airbag is housed in the casing in a condition of being folded back toward the side wall portion side, and the lower portion is housed in the casing in a condition of being folded back toward the occupant side.

Thereby, in the side-impact airbag, the lower portion thereof can be developed while releasing the folded-back condition at the occupant side opposite to the side wall portion side where a vehicle structure such as an elbow rest or the like exists so that the lower portion may be easily interrupted. Also, the upper portion of the airbag can be developed while releasing the folded-back state at the side wall portion side where a specific structure which may interrupt the upper portion does not exist. Therefore, since the side-impact airbag can be smoothly developed without being interrupted, a developing stability can be improved.

The third aspect of the invention is that, in the first or second aspects of the invention, at least one of the upper and lower portions of the airbag is housed in the casing in a condition of being respectively folded back into a roll shape by being repeatedly folded back in the turnback directions.

As for the third aspect of the invention, the side-impact airbag can be housed in the casing while the upper portion of the airbag is folded back into the roll shape by folding back toward the side wall portion side of the vehicle body, and the lower portion of the airbag is folded back into the roll shape by folding back toward the occupant side. As a result, in the side-impact airbag, the lower portion thereof can be developed while releasing the roll-shaped folded-back state at the occupant side opposite to the side wall portion side where a vehicle structure such as an elbow rest or the like exists so that the lower portion may easily be interrupted. Also, the upper portion of the airbag can be developed while releasing the roll-shaped folded-back state at the side wall portion side where a specific structure which may interrupt the upper portion does not exist. Therefore, since the side-impact airbag can be smoothly developed without being interrupted, a developing stability can be improved.

The fourth aspect of the invention is that, in any one aspect of the first to third aspects, the side-impact airbag includes a first bag portion disposed in a front portion of the airbag and serving as the upper portion limiting a movement of a shoulder portion of the occupant, and a second bag portion disposed at a lower side and serving as the lower portion limiting a movement of a waist portion of the occupant.

As for the fourth aspect of the invention, the first bag portion limiting the movement of the shoulder portion of the occupant is housed in the casing while being folded back toward the side wall portion side of the vehicle body, and the second bag portion limiting a movement of a waist portion of the occupant is housed in the casing while being folded back toward the occupant side. As a result, in the side-impact airbag, the second bag portion can be developed while releasing the folded-back state at the occupant side opposite to the side wall portion side where a vehicle structure such as the elbow rest or the like exists so that the second bag portion may be easily interrupted, and the first bag portion can be developed while releasing the folded-back state at the side wall portion side where the specific structure which may interrupt the first bag portion does not exist. Therefore, since the first bag portion and the second bag portion of the side-impact airbag can be smoothly developed without being interrupted thereon or the like, a developing stability can be improved.

The fifth aspect of the invention is that, in any one of the first to fourth aspects of the invention, a side-impact airbag apparatus includes a side-impact airbag, an inflator supplying a gas for expanding and developing the side-impact airbag, and a casing for housing the side-impact airbag and the inflator.

In the fifth aspect of the invention, the side-impact airbag is housed in the casing in a folded-back manner, and is expanded from the casing by the gas blown out from the inflator, and developed in the space between the occupant and the side wall portion of the vehicle body in the event of a lateral collision of a vehicle, a rollover of the vehicle body, or the like.

At this time, the side-impact airbag is housed in the casing while being folded back in such a way that the turnback directions of the upper and lower portions are opposite to each other in the width direction of the vehicle. Thereby, it becomes capable of housing the upper portion of the side-impact airbag in the casing while folding back the upper portion toward the side wall portion side of the vehicle body, and housing the lower portion in the casing while folding back the lower portion toward the occupant side. As a result, in the side-impact airbag, the lower portion thereof can be developed while releasing the folded-back state at the occupant side opposite to the side wall portion side where a vehicle structure such as an elbow rest or the like exists so that the lower portion may be easily interrupted. Also, the upper portion of the airbag can be developed while releasing the folded-back condition at the side wall portion side where a specific structure which may interrupt the upper portion does not exist. Therefore, since the side-impact airbag can be smoothly developed without being interrupted, a developing stability can be improved.

Further, in this case, in the side-impact airbag, since the upper portion of the side-impact airbag, situated nearer a head portion of the occupant, is developed at the side wall portion side opposite to the occupant side while releasing the folded-back state, there is also an advantage that safety is improved.

According to the present invention, a developing stability of the side-impact airbag can be improved.

DETAILED DESCRIPTION OF THE PREFERRED EMBODIMENTS

Hereinbelow, embodiments of the present invention will be explained with reference to the drawings.

Figure 1:
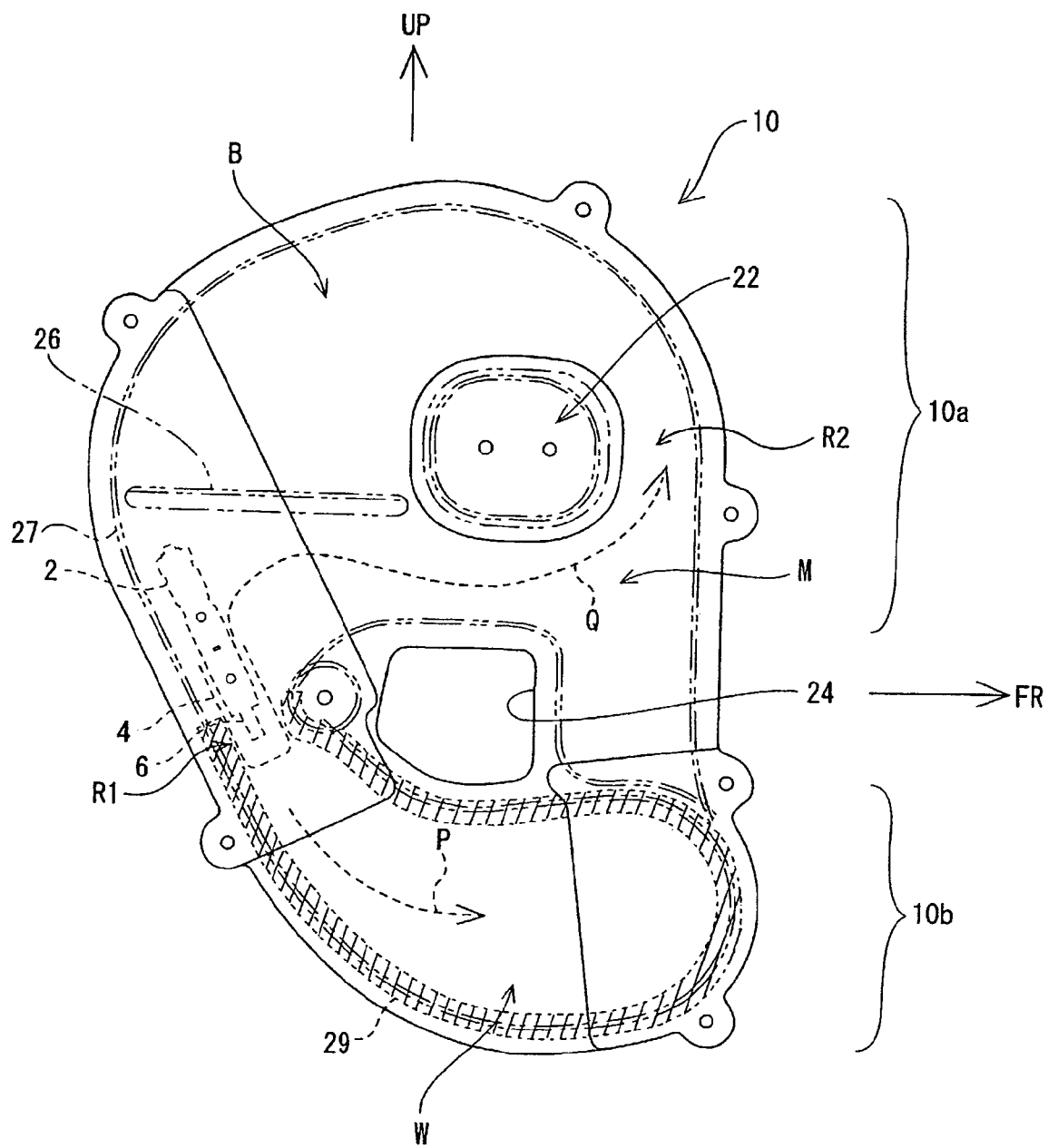
FIG. 1 is a development plan view illustrating a side-impact airbag according to a present embodiment.
Figure 2:
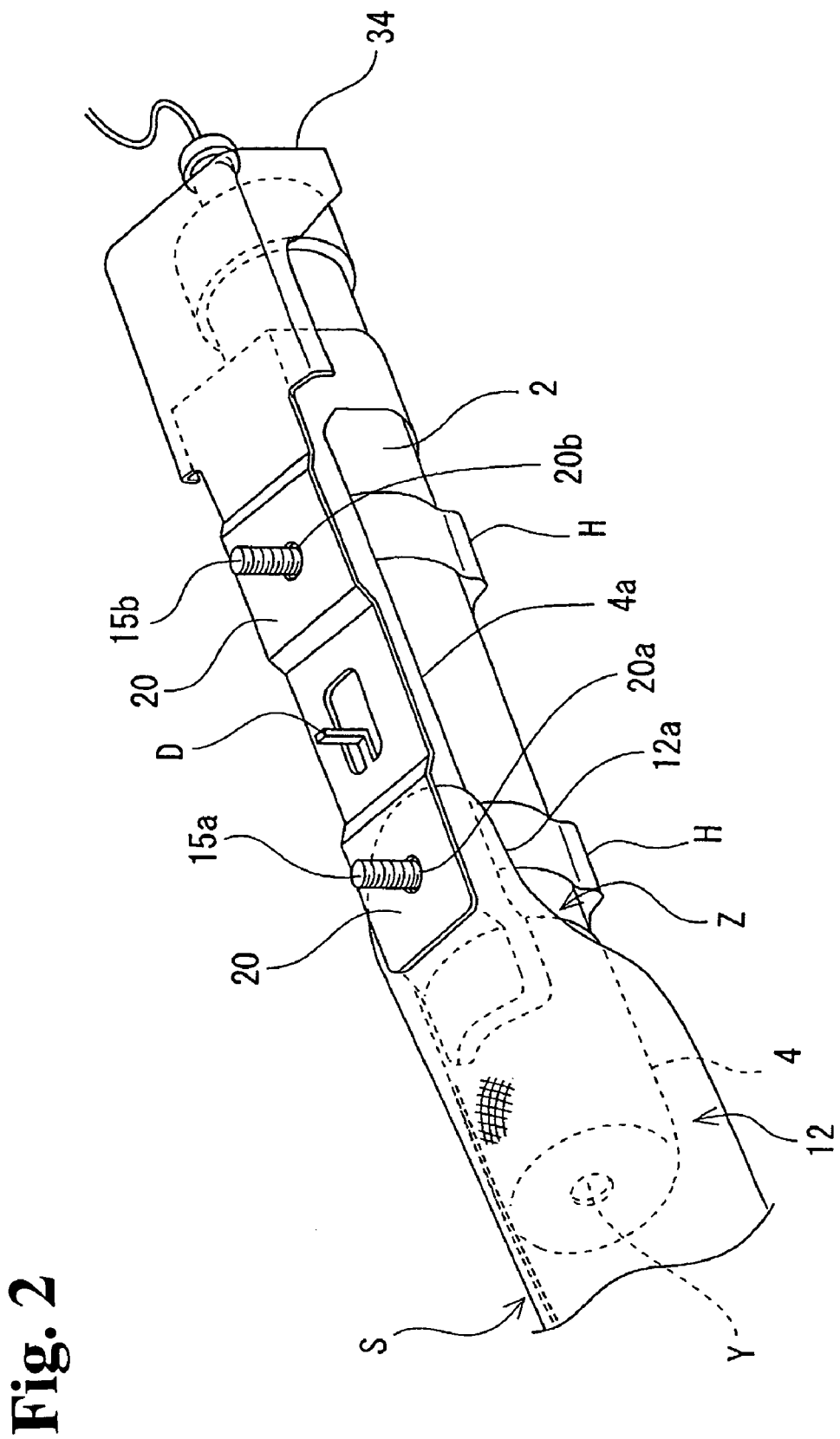
FIG. 2 is an entire perspective view illustrating an inflator blowing out a gas for expanding and developing the side-impact airbag according to the present embodiment.
Figure 3A:
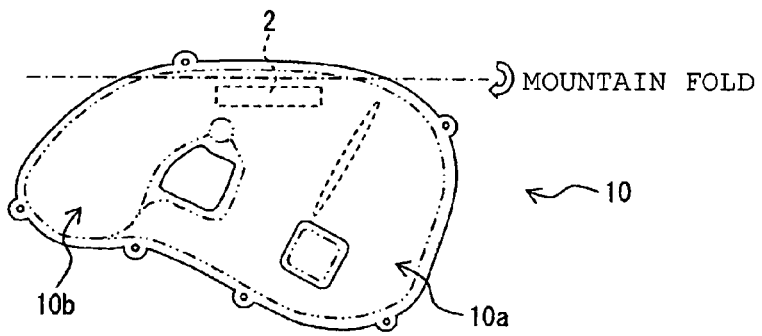
FIGS. 3(a) through 3(d) are views expressing a folding-back procedure for the side-impact airbag when the same is housed in a casing.
Figure 3B:
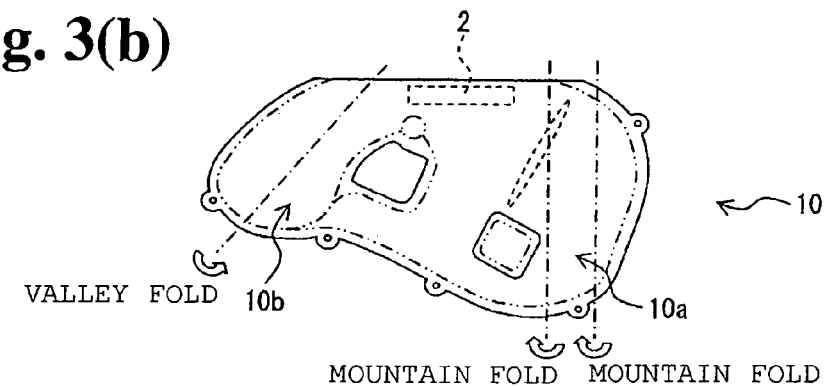
Figure 3C:
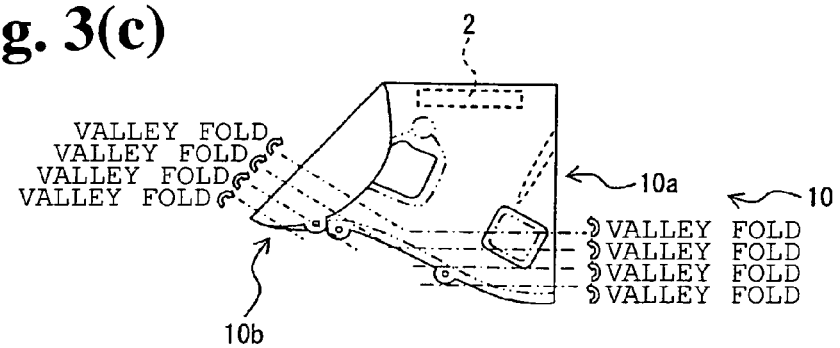
Figure 3D:
Figure 4:
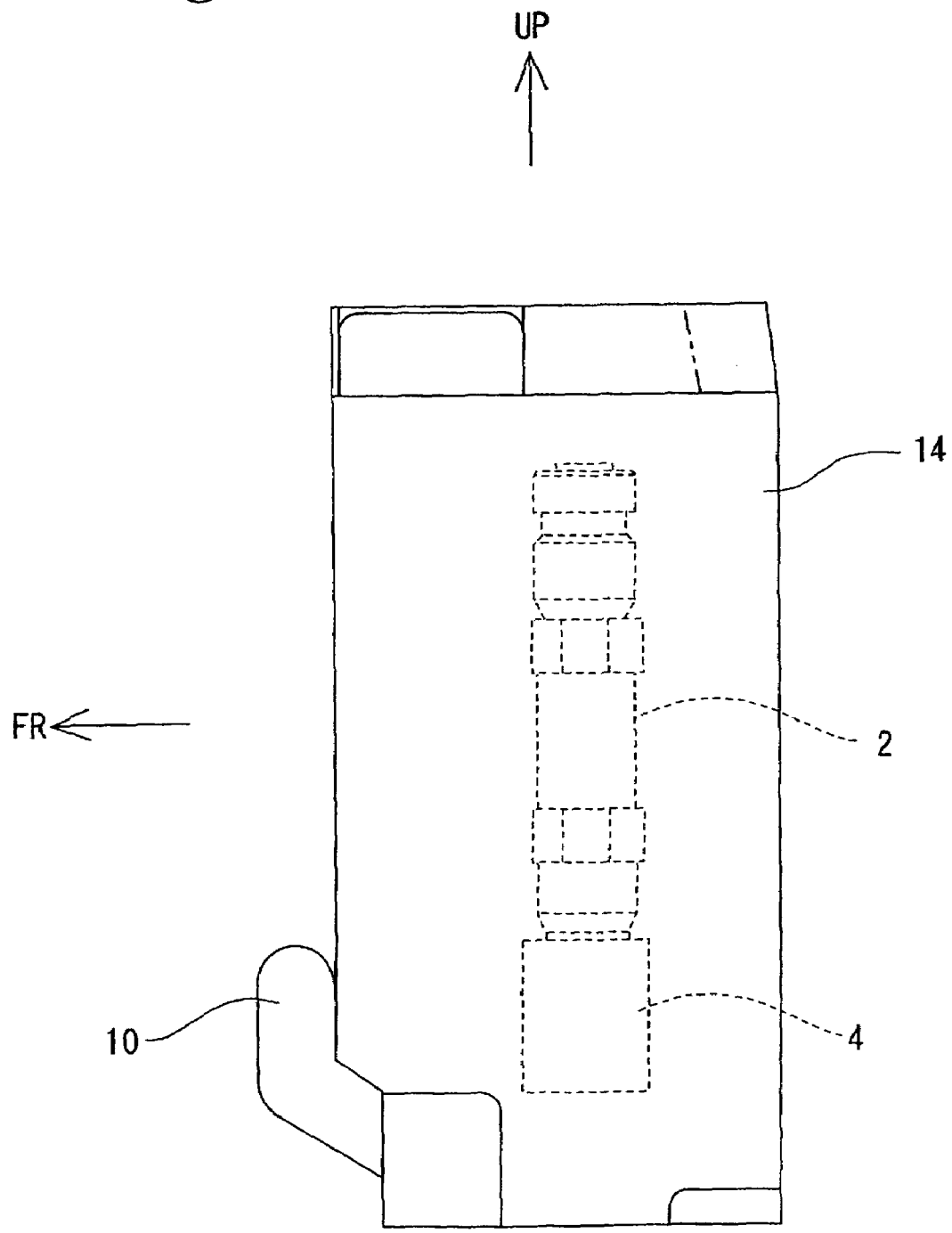
FIG. 4 is a plan view illustrating a condition in which the side-impact airbag is folded back when the same is housed in the casing.
Figure 5:
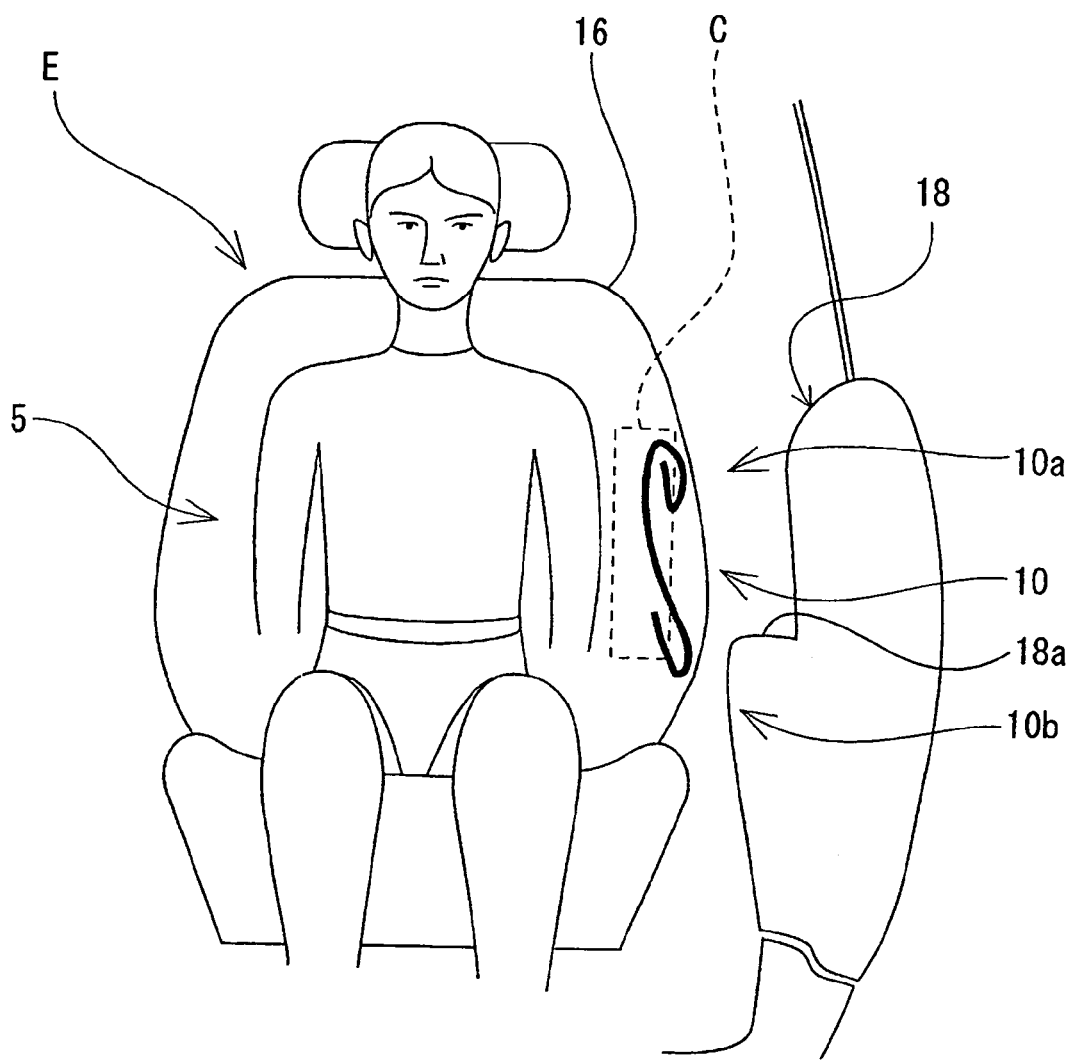
FIG. 5 is a view from a front side of the vehicle illustrating the side-impact airbag in a condition of a halfway of expanding and developing the same in a space between a side wall portion of a vehicle body and an occupant seated in a seat of the vehicle.

FIG. 1 is a development plan view illustrating a side-impact airbag of the present embodiment, FIG. 2 is an entire perspective view illustrating an inflator for blowing out gas for expanding and developing the side-impact airbag, FIGS. 3(a) through 3(d) are views showing a folding-back procedure for the side-impact airbag in housing the same in a casing, FIG. 4 is a plan view illustrating a condition in which a folding-back operation for the side-impact airbag is completed and the side-impact airbag is covered with an airbag cover, and FIG. 5 is a view from a front side of the vehicle illustrating the side-impact airbag in a condition of a halfway of expanding and developing the same in a space between a side wall portion of a vehicle body and an occupant seated in a seat in an inner part of vehicle body. Incidentally, in FIGS. 1 and 4, an arrow FR indicates a front side of a vehicle, and an arrow UP indicates an upward direction of the vehicle.

A side-impact airbag apparatus 1 is provided with a bag-shaped side-impact airbag 10, an inflator 2 for supplying a gas for expanding and developing the aforementioned side-impact airbag 10, and a casing C (refer to FIG. 5). The casing C is provided in a backrest portion 16 of a front seat E disposed in a vehicle interior, and houses the side-impact airbag 10 and the inflator 2.

As illustrated in FIG. 1, the side-impact airbag 10 is constructed as a bag-shaped body by forming base cloths into approximately the same shape and stitching base cloths along an entire periphery of an outer edge portion of the base cloths. A reference numeral 27 in FIG. 1 denotes a stitching portion of the base cloth, and all the stitching portion along the outer edge portion of the bag-shaped body is formed to have double stitch lines (incidentally, the stitching portion does not necessarily have double stitch lines, but it also may have a single stitch line).

Further, the side-impact airbag 10 is provided with a first bag portion 10a disposed at an upper side and having a chamber B for a chest portion for limiting a movement of a chest portion (including a shoulder portion) of an occupant 5, and a second bag portion 10b disposed at a lower side and having a chamber W for a waist portion for limiting a movement of a waist portion of the occupant 5. The aforementioned first bag portion 10a is provided with a middle chamber M at a lower portion of the aforementioned chamber B for the chest portion. The middle chamber M is positioned in the middle of both chambers W and B, and partitioned by means of the aforementioned chamber B, a tether cloth 26, and a non-expansion portion 22. Furthermore, in a first communicating portion R1 for allowing the aforementioned middle chamber M to communicate with the chamber W, the inflator 2 is mounted in such a manner that a convex portion 6 for blowing out the gas faces a side of the chamber W.

Furthermore, an opening 24 that penetrates the airbag in a width direction of a vehicle (in a direction perpendicular to a surface of the drawing in FIG. 2) is formed between the chamber W and the middle chamber M of the side-impact airbag 10. In such a construction as described above, when the inflator 2 is activated, the gas, which is adjusted to a predetermined flow volume, flows into the chamber W from the convex portion 6 through a gas outlet hole Y (refer to FIG. 2 described later) of a sleeve 4 (refer to a dashed arrow P in FIG. 2). In addition, the gas, which is adjusted to the predetermined flow volume, is led from the convex portion 6 to the front side by the tether cloth 26 in the middle chamber M through a flow path Z of the sleeve 4 (refer to FIG. 2). Then, the gas flows into the chamber B through a second communicating portion R2 that allows the middle chamber M to communicate with the chamber B (refer to a dashed arrow Q in FIG. 2).

Incidentally, in the aforementioned stitching portion 27 of an outer edge of the chamber W, a sealing member portion 29 is formed of an appropriate sealing material such as silicone rubber or the like along the stitching portion 27 for sealing the stitching portion 27. The sealing member portion 29 has a width greater than that of the stitching portion 27 of the double stitch lines (refer to FIG. 1) so that the sealing member portion 29 can seal over both of the double stitch lines of the stitching portion 27. Thereby, airtightness of the chamber W can be improved, and the pressure in the chamber W for limiting the movement of the waist portion of the occupant can be maintained at high pressure for a relatively long time.

As illustrated in FIG. 2, at one side in a longitudinal direction of the aforementioned inflator 2, which is a gas-blowing out side, the tubular sleeve 4 is provided so as to cover the convex portion 6 (refer to a left side in FIG. 2), and a tubular base cloth member 12 is further provided so as to cover the sleeve 4.

In the tubular sleeve 4, a gas outlet hole Y is formed at a tip end thereof in such a manner as to face the convex portion 6 of the inflator 2. A flow volume of the blowing-out gas is squeezed by the gas outlet hole Y, and a volume of the gas flowing into the chamber W is adjusted. On the other hand, the blowing-out gas, which is squeezed by the gas outlet hole Y, flows out from the flow path (circular gap) Z formed by an outer periphery of the one side in the longitudinal direction of a body of the inflator 2 and an opening end edge of the other side of the sleeve 4 (right side in FIG. 2) having a larger diameter than the outer periphery, and the blowing-out gas flows into the middle chamber M. At this time, an outer peripheral surface of the sleeve 4 and the sealing member portion 29 at a part of the communicating portion R1 are almost in close contact with each other, and are configured to prevent the blowing-out gas from leaking from the gaps therebetween (refer to FIG. 1). By this structure, a flow volume of the gas flowing into the chamber W and the middle chamber M (and the chamber B for the chest portion) from the inflator 2 is distributed at an appropriate rate by the sleeve 4.

The tubular base cloth member 12 is formed to have approximately a cylindrical shape by stitching the side edges of the flat shaped base cloth facing each other at a stitching portion S. Also, the tubular base cloth member 12 is provided with a one-way valve function for preventing the gas from flowing back from the chamber W to the middle chamber M when the airbag is developed. The tubular base cloth member 12 is provided with a latching piece 12a extended along the longitudinal direction of the inflator 2 at an end portion of the other side thereof (right side in FIG. 2). A latching hole (not shown) is provided in the latching piece 12a. A pair of supporting members H is disposed at respective front and back sides of the inflator 2. Each supporting member H has bolts 15a and 15b, respectively. The bolt 15a, provided at the gas-blowing out side of the inflator 2, is inserted and latched in the latching hole. In this state, the bolt 15a is inserted and latched in a latching hole 20a, and a stopper plate 20 is overlapped thereupon. Thereby, the latching piece 12a of the tubular base cloth member 12 is sandwiched by a supporting portion 4a of the sleeve 4 and the stopper plate 20.

The stopper plate 20 includes: a limiting portion 34 folded back so as to cover a part of an end portion of the inflator 2 at a side opposite to the gas-blowing out side of the inflator 2 (right side in FIG. 2); the two latching holes 20a, 20b respectively formed at positions corresponding to the aforementioned bolts 15a, 15b; and a projecting portion D formed by cutting and raising at a middle portion between the two latching holes 20a, 20b.

The limiting portion 34 of the stopper plate 20 prevents the inflator 2 from moving toward a side opposite to the gas-blowing out direction due to a kickback of the gas when being blown out. Further, the projecting portion D enables the projecting portion D to be confirmed from outside via a projecting-portion-confirmation-hole (not shown) formed in the casing C, when the side-impact airbag 10 is folded back and housed in the aforementioned casing C, and the projecting portion D also prevents the stopper plate 20 from being forgotten to be attached.

In the present embodiment, at a time of non-activation of the inflator 2, the side-impact airbag 10 is housed in an inner part of the casing C mounted in the backrest portion 16 of the front seat E disposed in the vehicle interior, together with the inflator 2 in such a way that turnback directions of the first and second bag portions 10a, 10b are opposite to each other in the width direction of the vehicle. Specifically, the side-impact airbag 10 is housed in a condition where the first bag portion 10a is folded back into a roll shape by being repeatedly turned back toward a door-inside portion 18 side (a side-wall portion side of the vehicle body), and the second bag portion 10b is folded back into a roll shape by being repeatedly turned back toward the occupant 5 side. Hereinbelow, the folding back procedure for the side-impact airbag 10 at this time will be explained with reference to FIGS. 3(a) through 3(d).

Firstly, as illustrated in FIG. 3(a), the side-impact airbag 10 at a backside of the vehicle (upside in FIGS. 3(a) through 3(d)) is folded back toward the door-inside portion 18 side (back side of the paper surface of FIGS. 3(a) through 3(d)) along the longitudinal direction of the inflator 2 (mountain fold). Next, as illustrated in FIG. 3(b), the first bag portion 10a is repeatedly folded back (mountain fold) toward the door-inside portion 18 side (backside of the paper surface of FIGS. 3(a) through 3(d)) and the second bag portion 10b is folded back (valley fold) toward the occupant 5 side (front side of the paper surface of FIGS. 3(a) through 3(d)).

Thereafter, as illustrated in FIG. 3(c), the first bag portion 10a at the front side of the vehicle (down side in FIG. 3(c)) and the second bag portion 10b at the front side of the vehicle (down side in FIG. (c)) are alternately and repeatedly folded back toward the occupant 5 side (front side of the paper surface of FIG. 3(c)), respectively (valley fold). As a result, as illustrated in FIG. 3(d), the side-impact airbag 10 is approximately folded back into a rectangular shape.

When the thus folded-back side-impact airbag 10 is housed in the casing C, as illustrated in FIG. 4, an airbag cover 14 for maintaining the folded-back condition is provided around the side-impact airbag 10 in the folded-back condition.

Further, when the inflator 2 is activated in the event of a lateral collision of the vehicle, a rollover of the vehicle body, or the like, the side-impact airbag 10 is expanded and developed from the casing C while releasing the folded-back state, and is finally expanded and developed in the space between the occupant 5 and the door-inside portion 18, while releasing the roll-shaped folded-back state of the first bag portion 10a where the first bag portion 10a is folded back toward the door-inside portion 18 side and also releasing the folded-back state of the second bag portion 10b toward the occupant 5 side, as illustrated in FIG. 5.

Next, operation and advantages of the present embodiment having the above-described construction will be explained. That is, as described above, in the present embodiment, the side-impact airbag 10 is housed in the casing C that is built in the backrest portion 16 of the seat E in a folded-back manner, and is expanded and developed in the space between the occupant 5 and the door-inside portion 18 from the casing C by the gas blown out from the inflator 2 in the event of the lateral collision of the vehicle, the rollover of the vehicle body, or the like.

At this time, the side-impact airbag 10 is housed in the inner part of the casing C in such a way that the turnback directions of the first and second bag portions 10a, 10b are opposite to each other in the width direction of the vehicle. Specifically, the side-impact airbag 10 is housed in a condition in which the first bag portion 10a is folded back into a roll shape by being repeatedly folded back toward the door-inside portion 18 side, and the second bag portion 10b is folded back into a roll shape by being repeatedly folded back toward the occupant 5 side, respectively.

Thereby, in the side-impact airbag 10, the second bag portion 10b can be developed while releasing the folded-back state at the occupant 5 side opposite to the door-inside portion 18 side where a vehicle structure such as an elbow rest 18a (refer to FIG. 4) or the like exists so that the second bag portion 10b may be easily interrupted. Also, the first bag portion 10a can be developed while releasing the folded-back state at the door-inside portion 18 side where a specific structure, by which the first bag portion 10a may be interrupted, does not exist. Therefore, since the side-impact airbag 10 can be smoothly developed without being interrupted thereon or the like, a developing stability can be improved.

Further, in the side-impact airbag 10, since the first bag portion 10a, situated nearer a head portion of the occupant 5, is developed at the door-inside portion 18 side opposite to the occupant 5 side, while releasing the folded-back state, there is also an advantage that safety is improved.

Incidentally, in the above-described embodiments, although a case in which the side-impact airbag 10 is provided with a plurality of bag portions (in the aforementioned embodiment, the first bag portion 10a and the second bag portion 10b) is exemplarily explained, the present invention can be applied to a side-impact airbag constructed from a single bag portion (single chamber).

Furthermore, in the above-described embodiments, although a case where the flow volume of the blown-out gas is distributed by the sleeve 4 at the gas-blowing out side of the inflator 2 is exemplarily explained, it is not always necessary to provide the sleeve 4 to obtain the advantage of improving the developing stability as a main objective of the present invention. That is, the present invention can also be applied to a case where, for example, a side-impact airbag has a two-chamber construction of a chamber for a waist portion and a chamber for a chest portion, said two chambers being allowed to communicate with each other in a front portion of the airbag, and where a blowing-out gas of the inflator 2 flows into the chamber for the waist portion and thereafter it flows into the chamber for the chest portion from the chamber for the waist portion via a communicating portion in the front portion of the airbag.

The disclosure of Japanese Patent Application No. 2007-207690, filed on Aug. 9, 2007, is incorporated in the application.

While the invention has been explained with reference to the specific embodiments of the invention, the explanation is illustrative and the invention is limited only by the appended claims.

What is claimed is:

1. A side-impact airbag to be housed in a casing and deployed between a side wall portion of a vehicle body and an occupant seated on a seat, comprising:
   an upper portion; and
   a lower portion situated below the upper portion,
      wherein the upper and lower portions are folded opposite to each other in a width direction of the vehicle and housed in the casing.

2. A side-impact airbag according to claim 1, wherein the upper portion is folded back toward the side wall portion of the vehicle, and the lower portion is folded back toward the occupant.

3. A side-impact airbag according to claim 1, wherein at least one of the upper and lower portions is folded back into a roll shape by repeatedly folding in one direction.

4. A side-impact airbag according to claim 2, wherein the upper portion includes a first bag portion for restraining a movement of a shoulder of the occupant, and the lower portion includes a second bag portion for restraining a movement of a waist portion of the occupant.

5. A side-impact airbag according to claim 4, further comprising a first communicating portion for connecting the first and second bag portions so that gas is distributed to the upper and lower portions.

6. A side-impact airbag according to claim 5, further comprising a tether and a non-expansion portion provided in the upper portion so that the tether and the non-expansion portion partially partition the upper portion and form a middle portion communicating with the first communicating portion.

7. A side-impact airbag according to claim 6, further comprising a second communicating portion provided between the upper portion and the middle portion so that the gas is distributed to the upper portion through the middle portion.

8. A side-impact airbag apparatus, comprising:
   the side-impact airbag according to claims 1;
   an inflator connected to the side-impact airbag for supplying gas to expand and develop the side-impact airbag; and
   the casing for housing the side-impact airbag and the inflator.

* * * * *